United States Patent [19]

Kappler et al.

[11] Patent Number: 5,231,155

[45] Date of Patent: Jul. 27, 1993

[54] HARDENABLE, FLUORINATED COPOLYMER, PROCESS FOR ITS MANUFACTURE AND ITS APPLICATION IN VARNISHES AND PLANTS

[75] Inventors: Patrick Kappler, Ecully; Jean-Luc Perillon, Bernay, both of France

[73] Assignee: Atochem, Puteaux, France

[21] Appl. No.: 693,132

[22] Filed: Jun. 14, 1991

Related U.S. Application Data

[62] Division of Ser. No. 511,566, Apr. 20, 1990, Pat. No. 5,037,922.

[30] Foreign Application Priority Data

Apr. 28, 1989 [FR] France ............................... 89 05731

[51] Int. Cl.$^5$ ................................................ C08F 12/20
[52] U.S. Cl. .................................... 526/249; 526/254; 526/255
[58] Field of Search .......................... 526/249, 254, 255

[56] References Cited

U.S. PATENT DOCUMENTS 4,278,773 7/1981 Kleber et al. ....................... 526/249

Primary Examiner—Joseph L. Schofer
Assistant Examiner—N. Sarofin

[57] ABSTRACT

A hardenable fluorinated copolymer of fluorinated monomers and an acrylamide derivative and paints, paints and varnishes comprising such copolymers, and the process of making such hardenable copolymer.

4 Claims, No Drawings

HARDENABLE, FLUORINATED COPOLYMER, PROCESS FOR ITS MANUFACTURE AND ITS APPLICATION IN VARNISHES AND PLANTS

This application is a division of application Ser. No. 07/511,566, filed Apr. 20, 1990 now U.S. Pat. No. 5,037,922.

BACKGROUND OF THE INVENTION

The present invention pertains to a hardenable, fluorinated copolymer of vinylidene fluoride ($C_2H_2F_2$), at least one fluorinated monomer selected from tetrafluoroethylene ($C_2F_4$), chlorotrifluoroethylene ($C_2F_2Cl$) or hexafluoropropylene ($C_3F_6$), and an acrylamide derivative. This copolymer, which is soluble in organic solvents, is particularly recommended for the manufacture of paints and varnishes.

Fluorinated polymers are known for their good mechanical properties and their excellent resistance to chemical products and weather. Nevertheless, their insolubility in conventional solvents makes them unusable for certain application such as, for example, that as a resin for paints and varnishes where their properties are sought for the manufacture of coatings with good chemical and weather resistance and easy maintenance.

In order to profit from the desirable properties of the fluorinated polymers while avoiding their drawbacks, means were sought to make them soluble in conventional organic solvents. In order to achieve this, it is known to decrease the crystallinity of fluoride-containing polymers by copolymerization of monomers unsaturated in the ethylene position, of which monomers at least one is fluorinated.

In addition, to use such copolymers it is desirable for certain applications, particularly for their application in the manufacture of paints and varnishes, to preserve for them a sufficient degree of rigidity and to make them hardenable by incorporation of functional groups into their structure.

Such hardenable, fluorinated copolymers are described in French Patents 2,597,873 and 2,569,703. These products are obtained by copolymerization of chlorotrifluoroethylene, a fatty acid ester, and hydroxylated or ethoxylated allyl glycidyl ether. These copolymers can possibly contain less than 20% of another, non-fluoride-containing comonomer. If these copolymers contain more than 20% of the preceding comonomer, they lose their solubility in solvents and their transparency. In addition, the introduction of fluorine by the use of chlorotrifluoroethylene alone also brings with it the chlorine-containing element which is not desirable in large amounts for the optical properties and resistance to corrosion.

In JP 59-174,657/84, there is also described a hardenable copolymer based on vinylidene fluoride, tetrafluoroethylene, chlorotrifluoroethylene, a vinyl ester and a hydroxylation agent. This copolymer, which contains less than 45% of vinyl ether fluoride and is based on vinyl ester, has the drawback of yielding after hydrolysis a rather strongly colored copolymer solution, which damages the transparency of the subsequently prepared varnishes.

SUMMARY OF THE INVENTION

The object of the present invention is a fluorinated copolymer, which is easily hardenable in the hot state in the possible presence of a hardening agent. When dissolved in an appropriate solvent, this copolymer may be used as a paint or varnish to form coatings which are hard, stable and transparent in the absence of pigments and which adhere well to metals and glass.

The hardenable copolymer in accordance with the invention, which contains the copolymerization radicals of a fluorinated monomer and an acrylamide derivative is characterized in that:

(i) the fluorinated monomer radicals originate from the association of vinylidene fluoride and another fluorinated monomer selected from among tetrafluoroethylene, chlorotrifluoroethylene, hexafluoropropylene, or the mixture of at least two of these three monomers, and (ii) in that the acrylamide derivative is selected from compounds of formula:

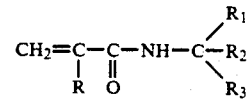

in which: R=H, $CH_3$, $R_1$ = H, $CH_3$, $O-(CH_2)_n-H$, $-\underset{\underset{O}{\|}}{C}O-(CH_2)-nH$, $-O-CH_2-\underset{\underset{O}{\|}}{C}-O-(CH_2)_nH$, $R_2$ = H, $CH_3$, $O-(CH_2O_n-H$, $-\underset{\underset{O}{\|}}{C}O-(CH_2)-_nH$, $R_3$ = H, $\underset{\underset{O}{\|}}{C}O-(CH_{3-x}(CH_2-OH)_x$ with:

n representing a number from 0 to 8,
and x representing a number from 0 to 3.

DETAILED DESCRIPTION

With respect to the copolymer, the association for 100 moles of the totality of fluorinated monomers is usually formed of:

(i) 50 to 98 moles of vinylidene fluoride, and
(ii) 2 to 50 moles of the other fluorinated monomer as defined.

Preferably, the hardenable, fluorinated copolymer in accordance with the invention is characterized in that it is comprised of monomer radicals originating from:

(i) 50 to 98 moles, preferably 70 to 85 moles, of vinylidene fluoride,
(ii) 2 to 50 moles, preferably 15 to 20 moles, of fluorinated monomer selected from among tetrafluoroethylene, chlorotrifluoroethylene, hexafluoropropylene, or a mixture of at least two of the three monomers, and
(iii) 2 to 30 moles, preferably 5 to 10 moles, of the preceding acrylamide derivative per 100 moles of the totality of fluorinated monomers.

Compounds of the following formulas can be cited among the preferred acrylamide derivatives:

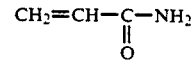

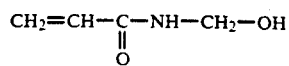

-continued

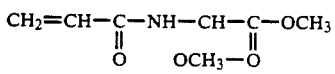

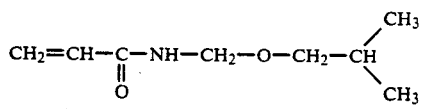

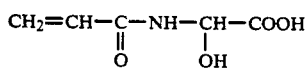

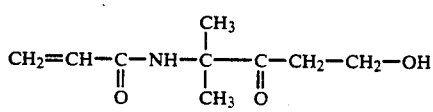

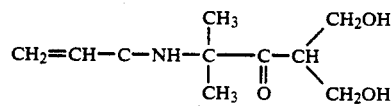

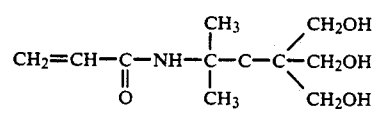

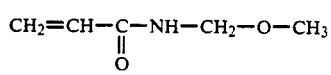

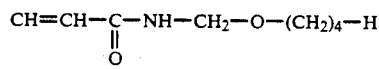

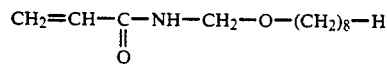

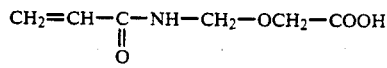

It is, of course, not excluded to associate several of these acrylamide derivatives, particularly an alkoxylated derivative and a hydroxylated derivative.

In order to be able to use these copolymers in a liquid coating composition such as paint or varnish, it is recommended that the inherent viscosity of the copolymer dissolved in dimethyl formamide at 25° C. at a concentration of 1 g/dL be within the range of 0.02 to 0.2 dL/g.

The copolymer in accordance with the invention is principally obtained according to the known solution polymerization procedures. A procedure consists of copolymerizing the monomers in a medium which is a solvent for all of the monomers, in the presence of an organosoluble initiator, at a temperature between 30° and 120° C., preferably between 40° and 80° C., under a pressure of approximately 10 to 80 bars, preferably between 15 and 40 bars.

In accordance with the invention, the hardenable copolymer is obtained by copolymerization of vinylidene fluoride, at least one fluorinated monomer selected from tetrafluoroethylene, chlorotrifluoroethylene, or hexafluoropropylene and the previously defined acrylamide derivative. The following are employed for 100 moles of polymerized, fluorinated monomers:

(i) 50 to 98 moles of vinylidene fluoride, and (ii) 2 to 50 moles of tetrafluoroethylene or chlorotrifluoroethylene or hexafluoropropylene or a mixture of at least two of the three monomers, with which is associated the previously defined acrylamide derivative.

In order to obtain a hardenable copolymer with the best properties, one usually associates 2 to 20 moles of the previously defined acrylamide derivative per 100 moles of the totality of the fluorinated monomers.

In accordance with the preferred copolymerization mode, the solvent is heated to the selected reaction temperature in an agitated reactor which has first been degassed. A mixture of fluorinated monomers as well as an initial fraction of the acrylamide derivative are introduced into the reactor.

The amount of monomer mixture to be introduced to reach the selected reaction pressure depends on the solubility conditions of the fluorinated monomers in the selected solvent. The monomer solvent weight ratio is generally between 0.1 and 1.

When the reaction pressure and the reaction temperature are reached, the polymerization initiator is introduced into the reaction. The formation of polymer is manifested by a drop in pressure which is compensated for by adding fluorinated monomer mixture.

One can add a fluorinated monomer mixture of molar composition identical to that which was introduced initially. It is also possible to take into account the individual reactivities of each comonomer and adjust the composition of the mixture added during polymerization in order to create a copolymer of homogeneous composition.

The acrylamide derivative can also be added during polymerization. The level of this derivative added continuously is generally higher than the levels of acrylamide derivative added initially, to take into account the greater reactivity of these derivatives.

The acrylamide derivative is added in such a manner that the composition of the mixture of fluorinated monomers and acrylamide derivative introduced remains constant during the duration of the polymerization.

The addition of monomer mixture for maintaining the pressure is continued for a sufficiently long period of time to reach a dry extract on the order of 10 to 60%, preferably 15 to 40%.

The volatile residual monomers can be eliminated by degassing.

The final solution is extracted from the reactor and can be stored in that form. It can also be concentrated immediately or subsequently in order to obtain the amount of dry extract selected for the use of the copolymer.

The solvents selected for the copolymerization reaction must allow solubilization of the monomer mixture while remaining inert in relation to the other reaction components. They are selected preferably from among the acetates and alcohols or their mixtures, ketones, and ether alcohols. Ethyl acetate, butyl acetate, methanol or tertiobutanol are particularly recommended. When the copolymer is prepared for the purpose of application in formulations for paint or varnish, a mixture of butyl acetate and methanol employed as solvent during the copolymerization can make it possible to obtain directly, without subsequent treatment, a composition which is usable as it is with, possibly, elimination of the methanol and addition of the complementary additives which are standard for these types of formulations.

The copolymerization initiators are known per se, the most popular being selected from among the radical polymerization initiators such as the perdicarbonates, perpivalates and azo compounds, such as diisopropyl or dicyclohexyl percarbonate, tertiobutyl or tertioamyl perpivalate, azobisisobutyronitrile and azo-bis-2,2-dimethylvaleronitrile.

When the cross-linkable copolymer in accordance with the invention is to be used as the basis for a paint or varnish formulation, it can, as was already mentioned, be used as it is in its initial reaction solvent medium. It can also be more or less concentrated and put again into solution in a solvent which is better adapted to the type of paint or varnish desired. As is, the copolymer in solvent medium yields a colorless and transparent solution. To this solution can be added the desired additives such as pigment, fillers, diluents, ultraviolet absorption agent, stabilizing agent or even hardening agent to improve the hardening reaction via hot cross linking. Among the most well-known hardening agents can be cited melamine formaldehyde, urea formaldehyde, the epoxides, isocyanates, organic acids or their anhydrides. The cross-linking temperature of these copolymers is generally between 0° and 260° C. and essentially depends on the chemical nature of the hardener and the conditions of implementation.

The invention will be further described in connection with the following examples which are set forth for purposes of illustration only.

EXAMPLE 1

Two liters of methanol are introduced into a 3.3-L autoclave equipped with effective agitation, which has been degassed under vacuum. The autoclave is brought to a temperature of 50° C. At this temperature, one adds 440 g of fluorinated monomer mixture containing vinylidene fluoride, tetrafluoroethylene and chlorotrifluoroethylene to reach 20 bars of pressure in the respective molar proportions of 79/15/6.

One then adds 4 g of N-methylolacrylamide and then 5 g of cyclohexyl perdicarbonate.

To maintain the pressure at 20 bars, one adds over five hours 540 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 16 g of N-methylolacrylamide (NMA).

After five hours of polymerization, the autoclave is degassed and one discharges a transparent copolymer solution which has a dry extract of 25%. The copolymer contains fluorinated structural units originating from the vinylidene fluoride, tetrafluoroethylene and chlorotrifluoroethylene in the respective molar proportions of 81/13/7, determined by NMR (nuclear magnetic resonance) of the fluorine 19. The molar level of N-methylolacrylamide in the copolymer is 2.6 mol. % in relation to the totality of fluorinated structural units. The inherent viscosity of the copolymer is 0.0437 dL/g.

EXAMPLE 2

Two liters of methanol are introduced into a 3.3-L autoclave equipped with effective agitation, which has been degassed under vacuum. The autoclave is brought to a temperature of 50° C. At this temperature, one adds 436 g of fluorinated monomer mixture containing vinylidene fluoride, tetrafluoroethylene and chlorotrifluoroethylene to reach 20 bars of pressure in the respective molar proportions of 79/15/6.

One then adds 13.6 g of methylacrylamidoglycolate methyl ether (MAGME) then 5 g of cyclohexyl perdicarbonate.

To maintain the pressure at 20 bars, one adds over six hours 440 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 41 g of methylacrylamidoglycolate methyl ether.

After six hours of polymerization, the autoclave is degassed and one discharges a transparent copolymer solution which has a dry extract of 22%. The copolymer contains fluorinated structural units originating from the vinylidene fluoride, tetrafluoroethylene and chlorotrifluoroethylene in the respective molar proportions of 81/13/7, determined by NMR Of the fluorine 19. The molar level of methylacrylamidoglycolate methyl ether in the copolymer is 5 mol. % in relation to the totality of fluorinated structural units. The inherent viscosity of the copolymer is 0.0483 dL/g.

EXAMPLE 3

Two liters of methanol are introduced into a 3.3-L autoclave equipped with effective agitation, which has been degassed under vacuum. The autoclave is brought to a temperature of 50° C. At this temperature, one adds 440 g of fluorinated monomer mixture containing vinylidene fluoride, tetrafluoroethylene and chlorotrifluoroethylene to reach 20 bars of pressure in the respective molar proportions of 79/15/6.

One then adds 11.5 g of acrylamidoglycolic acid and then 5 g of cyclohexyl peroxydicarbonate.

To maintain the pressure at 20 bars, one adds over three hours 350 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 23 g of acrylamidoglycolic acid.

After three hours of polymerization, the autoclave is degassed and one discharges a transparent copolymer solution which has a dry extract of 17.3%. The copolymer contains fluorinated structural units originating from the vinylidene fluoride, tetrafluoroethylene and chlorotrifluoroethylene in the respective molar proportions of 81/13/7, determined by NMR of the fluorine 19. The molar level of acrylamidoglycolic acid in the copolymer is 4.1 mol. % in relation to the totality of fluorinated structural units. The inherent viscosity of the copolymer is 0.046 dL/g.

EXAMPLE 4

Two liters of methanol are introduced into a 3.3-L autoclave equipped with effective agitation, which has been degassed under vacuum. The autoclave is brought to a temperature of 50° C. At this temperature, one adds 450 g of fluorinated monomer mixture containing vinylidene fluoride, tetrafluoroethylene and hexafluoropropylene to reach 20 bars of pressure in the respective molar proportions of 75/15/10.

One then adds 13.6 g of methylacrylamidoglycolate methyl ether (MAGME), then 5 g of cyclohexyl perdicarbonate.

To maintain the pressure at 20 bars, one adds over six hours 400 g of fluorinated monomer mixture containing vinylidene fluoride, tetrafluoroethylene and hexafluoropropylene in the respective molar proportions of 75/15/10.

One adds simultaneously and continuously over the same duration of polymerization 41 g of methylacrylamidoglycolate methyl ether.

After six hours of polymerization, the autoclave is degassed and one discharges a transparent copolymer solution which has a dry extract of 20.5%. The copolymer contains fluorinated structural units originating from the vinylidene fluoride, tetrafluoroethylene and hexafluoropropylene in the respective molar proportions of 79/15/6, determined by NMR of the fluorine 19. The molar level of methylacrylamidoglycolate methyl ether in the copolymer is 5.1 mol. % in relation to the totality of fluorinated structural units. The inherent viscosity of the copolymer is 0.0506 dL/g.

EXAMPLE 5

Two liters of methanol are introduced into a 3.3-L autoclave equipped with effective agitation, which has been degassed under vacuum. The autoclave is brought to a temperature of 50° C. At this temperature, one adds 440 g of fluorinated monomer mixture containing vinylidene fluoride, tetrafluoroethylene and chlorotrifluoroethylene to reach 20 bars of pressure in the respective molar proportions of 79/15/6.

One then adds 13.6 g of methylacrylamidoglycolate methyl ether (MAGME), then 4 g of N-methylolacrylamide (NMA), then 75 g of cyclohexyl perdicarbonate.

To maintain the pressure at 20 bars, one adds over five hours 440 g of fluorinated monomer mixture containing vinylidene fluoride, tetrafluoroethylene and chlorotrifluoroethylene in the respective molar proportions of 79/15/6.

One adds simultaneously and continuously over the same duration of polymerization 41 g of methylacrylamidoglycolate methyl ether and 12 g of N-methylolacrylamide.

After five hours of polymerization, the autoclave is degassed and one discharges a transparent copolymer solution which has a dry extract of 22%. The copolymer contains fluorinated structural units originating from the vinylidene fluoride, tetrafluoroethylene and chlorotrifluoroethylene in the respective molar proportions of 82/12/6, determined by NMR of the fluorine 19. The molar levels of MAGME and NMA in the copolymer are 5 to 2.5 mol. % in relation to the totally of fluorinated structural units. The inherent viscosity of the copolymer is 0.046 dL/g.

EXAMPLE 6

Into a 3.3-L autoclave equipped with effective agitation, which has been degassed under vacuum, one introduces ? liters of a 1/1 mixture by weight of methanol and tertiobutanol. The autoclave is brought to a temperature of 50° C. At this temperature, one adds 550 g of fluorinated monomer mixture containing vinylidene fluoride and chlorotrifluoroethylene to reach 20 bars of pressure in the respective molar proportions of 85/15.

One then adds 13.6 g of methylacrylamidoglycolate methyl ether (MAGME) and then 5 g of cyclohexyl perdicarbonate.

To maintain the pressure at 20 bars, one adds over six hours 440 g of fluorinated monomer mixture containing vinylidene fluoride and chlorotrifluoroethylene in the respective molar proportions of 75/25.

One adds simultaneously and continuously over the same duration of polymerization 49.5 g of methylacrylamidoglycolate methyl ether.

After six hours of polymerization, the autoclave is degassed and one discharges a transparent copolymer solution which has a dry extract of 22.5%. The copolymer contains fluorinated structural units originating from the vinylidene fluoride and chlorotrifluoroethylene in the respective molar proportions of 75/25, determined by NMR of the fluorine 19. The molar level of methylacrylamidoglycolate methyl ether in the copolymer is 5 mol. % in relation to the totality of fluorinated structural units. The inherent viscosity of the copolymer is 0.069 dL/g.

EXAMPLE 7

The fluorinated copolymer of Example 1 is heated under vacuum until evaporation of the methanol and then diluted with methyl isobutyl ketone.

A varnish is prepared by simple mixing of the constituents (in parts by weight):

| | | |
|---|---|---|
| (i) | fluorinated copolymer (2.6% of NMA and 49% of dry extract in methyl isobutyl ketone) | 100 |
| (ii) | partially methylated melamine formaldehyde resin (viscosity 7,000 mPa · s at 90% dry extract in isobutanol) | 23.3 |
| (iii) | p-toluene sulfonic acid | 0.2 |

The varnish is applied in 100 μm strokes on a 0.7 mm thick chromated aluminum support, then baked for 30 minutes at 180° C. to yield a 25 μm thick film. The cross-linkage is evaluated by the methyl ethyl ketone (MEK) resistance test in which a cotton cloth impregnated with methyl ethyl ketone is rubbed with a back and forth movement over the film until the film is abraded. A number of back and forth strokes between 50 and 100 is an indication of good cross-linkage. A number equal to 100 or more is the indication of excellent cross-linkage. The compatibility of the varnish is evaluated on the basis of the transparency of the films obtained with:

| | |
|---|---|
| E = excellent | total transparency |
| G = good | slight clouding |
| P = poor | translucent film |

The film produced above resisted more than 100 back and forth strokes with MEK and displayed an excellent transparency.

EXAMPLE 8

A paint is prepared under the following conditions:

One mixes 200 g of a solution in methyl isobutyl ketone of the copolymer of Example 7 with 98 g of titanium dioxide and 22 g of ethoxyethylpropionate in a ball mill so as to obtain a grinding paste with a grinding fineness smaller than 10 μm.

One takes 160 g of this paste and deconcentrates it with 23.3 g of partially methylated melamine formaldehyde resin, 0.2 g of p-toulene sulfonic acid and 30 g of ethoxyethylpropionate to yield a white paste which has a Ford cup number 4 viscosity of 85 seconds.

This white paint is applied on chromated aluminum with 100 m spiral strokes and then baked for 30 minutes at 180° C. in order to obtain a 25 μm thick film. The paint obtained resists more than 100 back and forth strokes with methyl ethyl ketone (MEK), has a Gardner luster measured at 60° of 42.2%, a class 0 adherence determined according to NFT standard 30 038 and is not affected by a 1,000 hour exposure to the Q.U.V. The Q.U.V. is an accelerated aging device in which the effects of sunlight are reproduced by means of four tubes emitting ultraviolet rays. The temperature during the ultraviolet exposure is 63° C. A water-condensation device makes it possible to maintain the humidity level at 100% relative humidity during the condensation phase. The temperature of the sample during the condensation phase is 50° C. The condensation and irradiation phases, each lasting four hours, are alternated.

EXAMPLE 9

The fluorinated copolymer of Example 2 is heated under vacuum until evaporation of the methanol and then diluted with methyl isobutyl ketone (MIBK).

A varnish is prepared by simple mixing of the constituents (in parts by weight):

| | | |
|---|---|---|
| (i) | fluorinated copolymer (5 mol. % of MAGME at 50% of dry extract in methyl isobutyl ketone) | 100 |
| (ii) | partially methylated melamine formaldehyde resin (viscosity 7,000 mPa · s at 90% dry extract in isobutanol) | 23.8 |
| (iii) | p-toluene sulfonic acid | 0.2 |

This varnish is applied in 100 μm strokes on a 0.7 mm thick chromated aluminum support, then baked so as to reach a minimum plate temperature (MPT) of 250° C. for 45 seconds so as to yield a 24 μm thick, dry film.

EXAMPLE 10

A paint is preppared under the following conditions:
One mixes 200 g of a solution in MIBK of the copolymer of Example 9 with 64.2 g of blue cobalt pigment and 31.5 g of ethoxyethylpropionate in a ball mill so as to obtain a grinding paste with a grinding fineness smaller than 10 μm.

One takes 148 g of this paste and deconcentrates it with 23.8 g of partially methylated melamine formaldehyde resin, 0.2 g of para-toluene sulfonic acid, and 20 g of ethoxyethylpropionate to obtain a Ford cup number 4 viscosity of 80 seconds.

This blue paint is applied on a 0.7 mm thick chromated aluminate plate with 100 μm strokes and then baked so as to achieve a MPT of 250° C. for 45 seconds, yielding a 23 μm thick, dry film.

The paint obtained resists more than 100 back and forth strokes with MEK, has a Gardner luster measured at 60° of 44%, a class 0 adherence determined according to NFT standard 30 038 and is not affected by a 1,000 hour exposure to the Q.U.V.

EXAMPLE 11

The fluorinated copolymer of Example 3 is heated under vacuum until evaporation of the methanol and then diluted with diacetone alcohol.

A varnish prepared by simple mixing of constituents (in parts by weight):

| | | |
|---|---|---|
| (i) | fluorinated copolymer (4.1 mol. % of acrylamidoglycolic acid at 50% in diacetone alcohol) | 100 |
| (ii) | blocked cycloaliphatic polyisocyanate (in solution at 60% in n-butylacetate/xylene blocked NCO content 8%) | 50.9 |
| (iii) | dibutyltin dilaurate | 0.1 |

This varnish is applied in 100 μm strokes on a 0.7 mm thick chromated aluminum plate, then baked at 150° C. for 30 minutes so as to yield a 20 μm thick film.

This film endures without damage 100 back and forth strokes with MEK and exhibits excellent transparency.

EXAMPLE 12

The fluorinated copolymer of Example 4 is heated under vacuum until evaporation of the methanol and then diluted with methyl isobutyl ketone.

A varnish prepared by simple mixing of the constituents (in parts by weight):

| | | |
|---|---|---|
| (i) | fluorinated copolymer (5.1 mol % of MAGME at 52% of dry extract in methyl isobutyl ketone (MIBK)) | 100 |
| (ii) | partially methylated melamine formaldehyde resin (viscosity 7,500 mPa · s at 90% in isobutanol) | 24.8 |
| (iii) | p-toluene sulfonic acid | 0.2 |

This varnish is applied in 100 μm strokes on a 0.7 mm thick chromated aluminum support, then baked at 180° C. for 30 minutes so as to yield a 24 μm thick, dry film.

This film endures without damage 100 back and forth strokes with MEK and exhibits excellent transparency.

EXAMPLE 13

The fluorinated copolymer of Example 5 is heated under vacuum until evaporation of the methanol and then diluted with methyl isobutyl ketone.

A varnish is prepared by simple mixing of the constituents (in parts by weight):

| | | |
|---|---|---|
| (i) | fluorinated copolymer (2.5% NMA + MAGME at 50% of dry extract in MIBK) | 100 |
| (ii) | p-toluene sulfonic acid | 0.2 |

This varnish is applied in 150 μm strokes on a 0.7 mm thick chromated aluminum support, then baked at 200° C. for 30 minutes so as to yield a 19 μm thick, dry film.

This film endures without damage 100 back and forth strokes with MEK and exhibits excellent transparency.

EXAMPLE 14

The fluorinated copolymer of Example 6 is heated under vacuum until evaporation of the methanol and then diluted with diacetone alcohol.

A varnish is prepared by simple mixing of the constituents (in parts by weight):

| | | |
|---|---|---|
| (i) | fluorinated copolymer (5.1 mol. % of MAGME at 55% of dry extract in diacetone alcohol) | 100 |
| (ii) | hexamethoxymethylmelamine resin | 9.7 |
| (iii) | p-toluene sulfonic acid | 0.2 |

This varnish is applied in 100 μm strokes on a 0.7 mm thick chromated aluminum support, then baked so as to reach a minimum plate temperature (MPT) of 250° C. for 40 seconds, yielding a 23 μm thick, dry film.

This film endures without damage 100 back and forth strokes with MEK and exhibits excellent transparency.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A paint or varnish consisting essentially of a hardenable copolymer in an amount sufficient to form a coating and a solvent for said copolymer, said hardenable copolymer containing the copolymerization radicals of a fluorinated monomer and an acrylamide derivative wherein:
   (a) the fluorinated monomer radicals originate from the association of vinylidene fluoride and at least one fluorinated monomer selected from tetrafluoroethylene, chlorotrifluoroethylene, hexafluoropropylene, or a mixture of at least two of the three monomers, and
   (b) the radicals of the acrylamide derivative originate from one of the compounds of the formula:

$$CH_2=C-C-NH-C\begin{matrix}R_1\\R_2\\R_3\end{matrix}$$
$$\begin{matrix}|&\|\\R&O\end{matrix}$$

wherein
R is H or $CH_3$, $R_1$ is H, $CH_3$, $O-(CH_2)_n-H$, $CO-(CH_2)_nH$,
$\qquad\qquad\qquad\qquad\qquad\quad\|$
$\qquad\qquad\qquad\qquad\qquad\quad O$ or $O-CH_2-CO-(CH_2)_n$,
$\qquad\qquad\quad\|$
$\qquad\qquad\quad O$ $R_2$ is H, $CH_3$, $O-(CH_2)_nH$ or $CO-(CH_2)_nH$, and
$\qquad\qquad\qquad\qquad\qquad\qquad\|$
$\qquad\qquad\qquad\qquad\qquad\qquad O$ $R_3$ is H or $CO-C(H)_{3-x}(CH_2-OH)_x$,
$\qquad\quad\|$
$\qquad\quad O$ with:
n representing a number from 0 to 8, and
x representing a number from 0 to 3.

with:
n representing a number from 0 to 8, and
x representing a number from 0 to 3.

2. The paint or varnish of claim 1 wherein for 100 moles of the totality of the fluorinated monomers, the following are used:
   (a) 50 to 98 moles of vinylidene fluoride
   (b) 2 to 50 moles of fluorinated monomer selected from tetrafluoroethylene, chlorotrifluoroethylene, hexafluoropropylene, or the mixture of at least two of these three monomers, and
   (c) 2 to 30 moles of acrylamide derivative per 100 moles of the totality of the fluorinated monomers.

3. The paint or varnish of claim 1 or 2 including a hardening agent capable of cross-linking said copolymer at a temperature of about 0° to 260° C.

4. The paint or varnish of claim 1, wherein the association for 100 moles of fluorinated monomers is constituted of:
   (a) 50 to 98 moles of vinylidene fluoride, and
   (b) 2 to 50 moles of fluorinated monomer selected from tetrafluoroethylene, chlorotrifluoroethylene, hexafluoropropylene, or a mixture of at least two of these three monomers.

* * * * *

UNITED STATES PATENT AND TRADEMARK OFFICE
CERTIFICATE OF CORRECTION

PATENT NO. : 5,231,155
DATED : July 27, 1993
INVENTOR(S) : Patrick Kappler et al It is certified that error appears in the above-identified patent and that said Letters Patent is hereby corrected as shown below:

On the title page, item [54] and column 1, line 4, change "PLANTS" to --PAINTS--.

Signed and Sealed this

Eighth Day of March, 1994

BRUCE LEHMAN

Attest:

Attesting Officer

Commissioner of Patents and Trademarks